United States Patent
Henningson et al.

(10) Patent No.: US 10,518,647 B2
(45) Date of Patent: Dec. 31, 2019

(54) SYSTEM AND METHOD FOR CONTROLLING AN ALTERNATING CURRENT POWER INVERTER

(71) Applicants: Dale B. Henningson, Manti, UT (US); Bruce A. Purkey, Lowell, AR (US)

(72) Inventors: Dale B. Henningson, Manti, UT (US); Bruce A. Purkey, Lowell, AR (US)

(73) Assignee: Purkey's Fleet Electric, Inc., Lowell, AR (US)

( * ) Notice: Subject to any disclaimer, the term of this patent is extended or adjusted under 35 U.S.C. 154(b) by 0 days.

(21) Appl. No.: 15/452,702

(22) Filed: Mar. 7, 2017

(65) Prior Publication Data
US 2017/0253132 A1  Sep. 7, 2017

Related U.S. Application Data

(60) Provisional application No. 62/304,361, filed on Mar. 7, 2016.

(51) Int. Cl.
*B60L 11/18* (2006.01)

(52) U.S. Cl.
CPC ....... *B60L 11/1811* (2013.01); *B60L 2210/30* (2013.01)

(58) Field of Classification Search
CPC .............. B60L 11/1811; B60L 11/1861; B60L 2250/16; B60L 2210/30
See application file for complete search history.

(56) References Cited

U.S. PATENT DOCUMENTS

| | | | | |
|---|---|---|---|---|
| 6,037,749 A * | 3/2000 | Parsonage | ........... | B60L 11/1859 320/132 |
| 6,150,793 A * | 11/2000 | Lesesky | ................... | F02N 11/08 320/103 |
| 6,252,377 B1 * | 6/2001 | Shibutani | ........... | G01R 31/3648 320/132 |
| 7,145,788 B2 * | 12/2006 | Plummer | ........... | B60H 1/00278 363/141 |
| 7,642,670 B2 * | 1/2010 | Rosendahl | ............ | B60L 3/0069 307/10.1 |
| 7,719,126 B2 * | 5/2010 | Foreman | ............ | B60H 1/00428 290/4 A |
| 9,156,356 B2 * | 10/2015 | Rini | ....................... | H02J 7/0031 |
| 2011/0245987 A1 * | 10/2011 | Pratt | ..................... | H01M 10/44 700/295 |
| 2013/0026989 A1 * | 1/2013 | Gibbs | ................. | H01M 10/441 320/116 |

(Continued)

*Primary Examiner* — Jares Fureman
*Assistant Examiner* — Michael J Warmflash
(74) *Attorney, Agent, or Firm* — Gurr Brande & Spendlove; Robert A. Gurr

(57) ABSTRACT

A system for controlling an AC power inverter has a charging power source (e.g., vehicle alternator), a battery (e.g., vehicle crank battery), a DC to AC power inverter, a shunt or current-measuring device (which may either be internal to, or external to, the AC power inverter), electrical connections (i.e., cables and connections between the charging power source, battery, AC power inverter, and shunt), and a control module; wherein the control module is capable of measuring shunt voltage, battery voltage, elapsed time, and is capable of turning the AC power inverter On and Off based upon certain criteria (i.e., control logic).

7 Claims, 4 Drawing Sheets

(56) References Cited

U.S. PATENT DOCUMENTS

| | | | |
|---|---|---|---|
| 2015/0021985 A1* | 1/2015 | Matsuda | B60L 11/1877 307/10.1 |
| 2016/0059803 A1* | 3/2016 | Klesyk | H02J 7/1438 307/9.1 |

* cited by examiner

SYSTEM AND METHOD FOR CONTROLLING AN ALTERNATING CURRENT POWER INVERTER

CROSS-REFERENCE TO RELATED APPLICATIONS

This application claims the benefit of U.S. Provisional Application Ser. No. 62/304,361, filed on Mar. 7, 2016, which is incorporated herein by reference.

TECHNICAL FIELD

The present disclosure relates to vehicle-mounted power inverters. More particularly, the present disclosure is directed to systems and methods for monitoring and controlling an AC power inverter for use on a vehicle.

BACKGROUND

Alternating Current ("AC") power inverters are gaining popularity as on-vehicle power sources for passenger cars/trucks, recreational vehicles, and heavy-duty long-haul trucks. Typically, these AC power inverters are designed to receive power from a low voltage Direct Current ("DC") source such as a 12 V or 24 V battery. These AC power inverters typically have a low voltage set-point that allow the AC power inverters to run until the batteries supplying them are nearly completely drained.

In passenger cars and trucks, the AC power inverters are typically used while the vehicle is running. Because the alternator generates sufficient power, the AC power inverter is prevented from otherwise draining the vehicle's battery.

In recreational vehicles, the AC power inverters are usually paired with dedicated deep-cycle batteries that are charged from the vehicle's electrical system, from an AC powered charger, or from solar panels. Because these batteries are separate from, and isolated from, the batteries that are used to start the vehicle, the AC power inverter does not discharge the vehicle's starting batteries. Therefore, the AC power inverter can utilize the deep-cycle batteries until they are depleted without affecting the ability of the vehicle to start.

In contrast, on heavy-duty long-haul trucks, the AC power inverters are typically powered from the truck's batteries, which also serve to start the truck. Because the AC power inverters can be used for periods of time when the truck is not running, the AC power inverters often deplete the batteries to the point where they do not have sufficient energy to crank the engine and start the truck. Due to this problem, some equipment owners or managers do not allow their drivers to use AC power inverters in their trucks, or only allow drivers to use AC power inverters while the truck is running. Drivers who essentially live out of the trucks they drive want, and in some cases need, some of the comforts and offerings that AC power inverters provide.

In an attempt to solve this problem, inverters with higher low-voltage set-points have been used to preserve power for starting the engine. These have been somewhat successful, but in order to guarantee that the crank battery will have sufficient energy, the set-point must be set quite high. This causes problems with the AC power inverter turning off too soon when the driver/operator utilizes higher-power AC devices that draw a high current for a short period of time.

In another attempt to solve this problem, timers have been utilized in conjunction with AC power inverters that allow the inverter to be used for a predetermined number of hours.

Again, these have been somewhat successful, but suffer from the problems of sometimes (when high-power AC devices are used) allowing too much energy to be used and thereby compromising the vehicle's ability to start. Another drawback is that the timer sometimes prohibits the drivers from being able to use devices that only require a small amount of energy, despite the batteries having sufficient energy to do so. The present invention seeks to solve these, and other, problems.

SUMMARY OF EXAMPLE EMBODIMENTS

In one embodiment, a control module reads battery voltage, shunt voltage, alternator status (e.g., monitoring the R-terminal, W-terminal, lamp voltage, or other signal that indicates that the alternator is active), and On/Off switch voltage, and, based upon the control logic, turns the AC power inverter On and Off.

In one embodiment, a system for controlling an AC power inverter comprises a charging power source (e.g., vehicle alternator), a battery (e.g., vehicle crank battery), a DC to AC power inverter, a shunt or current-measuring device (which may either be internal to, or external to, the AC power inverter), electrical connections (i.e., cables and connections between the charging power source, battery, AC power inverter, and shunt), and a control module; wherein the control module is capable of measuring shunt voltage, battery voltage, elapsed time, and is capable of turning On and Off the AC power inverter based upon certain criteria (i.e., control logic).

DETAILED DESCRIPTION OF EXAMPLE EMBODIMENTS

Figure 1:
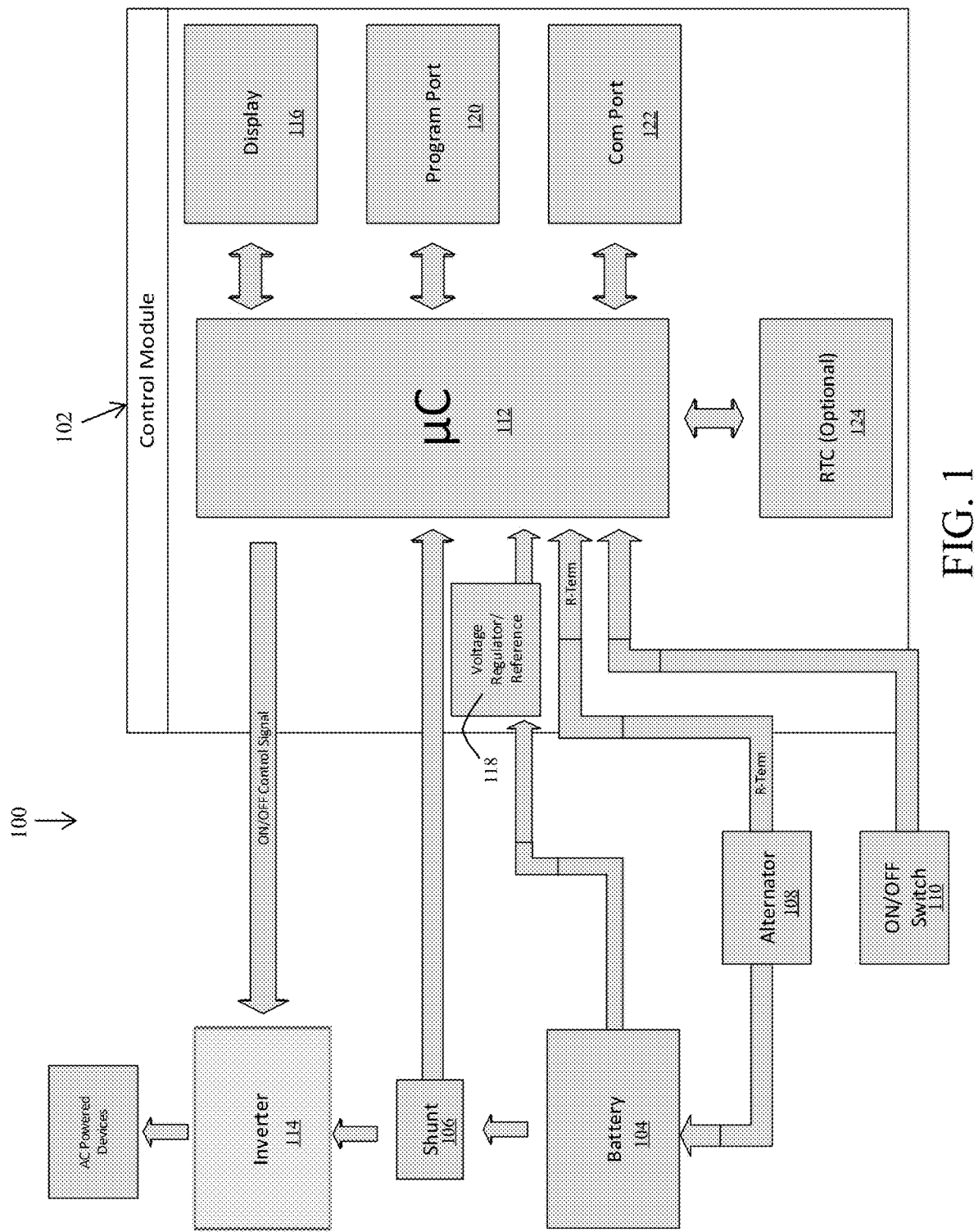
FIG. 1 is a block diagram of a system for controlling an inverter.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," does not necessarily refer to the same embodiment, although it may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

Non-Limiting Descriptions of Components:

Alternator: generates power for the vehicle's electrical needs and charges the vehicle's battery.

Alternator Status: the On/Off state of the Alternator, which is determined by monitoring the R-terminal, W-terminal, lamp voltage, or other signal that indicates the active status of the Alternator.

Battery: provides power to start the vehicle and also powers the AC power inverter.

Shunt: produces a voltage proportional to the current that the AC power inverter draws from the battery.

AC power inverter (also referred to as "Inverter"): converts DC power to AC power.

AC Powered Devices: devices that require AC power input and receive such input from the Inverter (e.g., a microwave, television, radio, etc.).

On/Off Override Switch: When in the Off position, the switch indicates to the control module (such as the control module reading the voltage at the switch) to turn Off the AC power inverter. When the On/Off Switch is On, the control module has control of turning On and Off the AC power inverter based upon several factors (discussed below) and predetermined logic.

Voltage Regulator/Reference: generates a regulated voltage that is used to power the electronics on the control module and also serves as a voltage reference for the analog to digital converter ("ADC") that is built into the microcontroller.

Display: an LCD display or a configuration of light emitting diodes (LED's) that indicate the status of the AC power inverter (On or Off), and, if On, it may also indicate the energy that the AC power inverter has used and/or the energy that is remaining for use.

Program Port: communication to the microcontroller for programming the control logic into the microcontroller.

Communication Port (also referred to as "Com Port"): communication port to the control module for configuring or setting-up the control parameters.

Real-Time-Clock (RTC): optional clock module for setting operational parameters based on the time of day.

DETAILED DESCRIPTION

The present disclosure addresses the wants and needs of the drivers to have access to AC power, as well as the needs of the equipment owners and managers to have equipment that will start and function day after day. The present invention allows the amount of energy to be removed from the batteries to be determined by design, so that drivers have a known amount of energy that they can use, which will leave sufficient energy in the batteries to start the vehicle.

Another advantage of the present invention is that it allows for a dynamically-adjustable voltage shutoff set-point. The problem with a fixed-voltage shutoff set-point is that the voltage of the battery is substantially affected by the amount of current being drawn from the battery. A voltage set point of 11.8 volts, for example, could be too low to allow for sufficient power to remain in the batteries to start a vehicle if the current being drawn from the battery is low. The same set-point could be too high if a surge of current temporarily pulls the battery voltage down. In one embodiment, the present invention measures the current that the AC power inverter pulls from the batteries and uses that current to calculate the voltage shutoff point. This makes it so that the AC power inverter does not overly drain the batteries when the current that it pulls is low, or so that the AC power inverter does not turn off too early due to a drop in voltage caused by a higher current draw.

In one embodiment, as shown generally in FIG. 1, a system 100 for controlling an AC power inverter comprises a control module 102 that reads the voltage at battery 104, the voltage at shunt 106, the On/Off status of the alternator 108 (accomplished by monitoring the R-terminal, W-terminal, lamp voltage, or other signal that indicates that the alternator is active), and the voltage of the Override On/Off switch 110. Then, using control logic on the microcontroller 112, the control module 102 turns the AC power inverter 114 On and Off. The shunt voltage is used to compute the current that the AC power inverter 114 draws from the battery 104. The R-terminal (or equivalent) voltage is used to determine when the alternator 108 is running (no voltage indicates that the alternator 108 is not running and a high voltage indicates that the alternator 108 is running). Alternatively, the battery voltage can be used to get an indication of the status of the alternator 108. For example, in a 12-volt system, a battery voltage below 13.2 volts indicates that the alternator 108 is not running and a voltage over 13.2 volts indicates that the alternator 108 is running. Static battery voltage (voltage when the battery is not being charged nor drained) can also be used to compute an approximate state of charge of the battery 104. The microcontroller 112 uses battery voltage in conjunction with the current being drawn to estimate the state of charge of the battery 104 when the AC power inverter 114 is drawing current. The microcontroller 112 uses current and time to calculate the energy in amp-hours that the AC power inverter 114 has utilized during a period of time.

Figure 2:
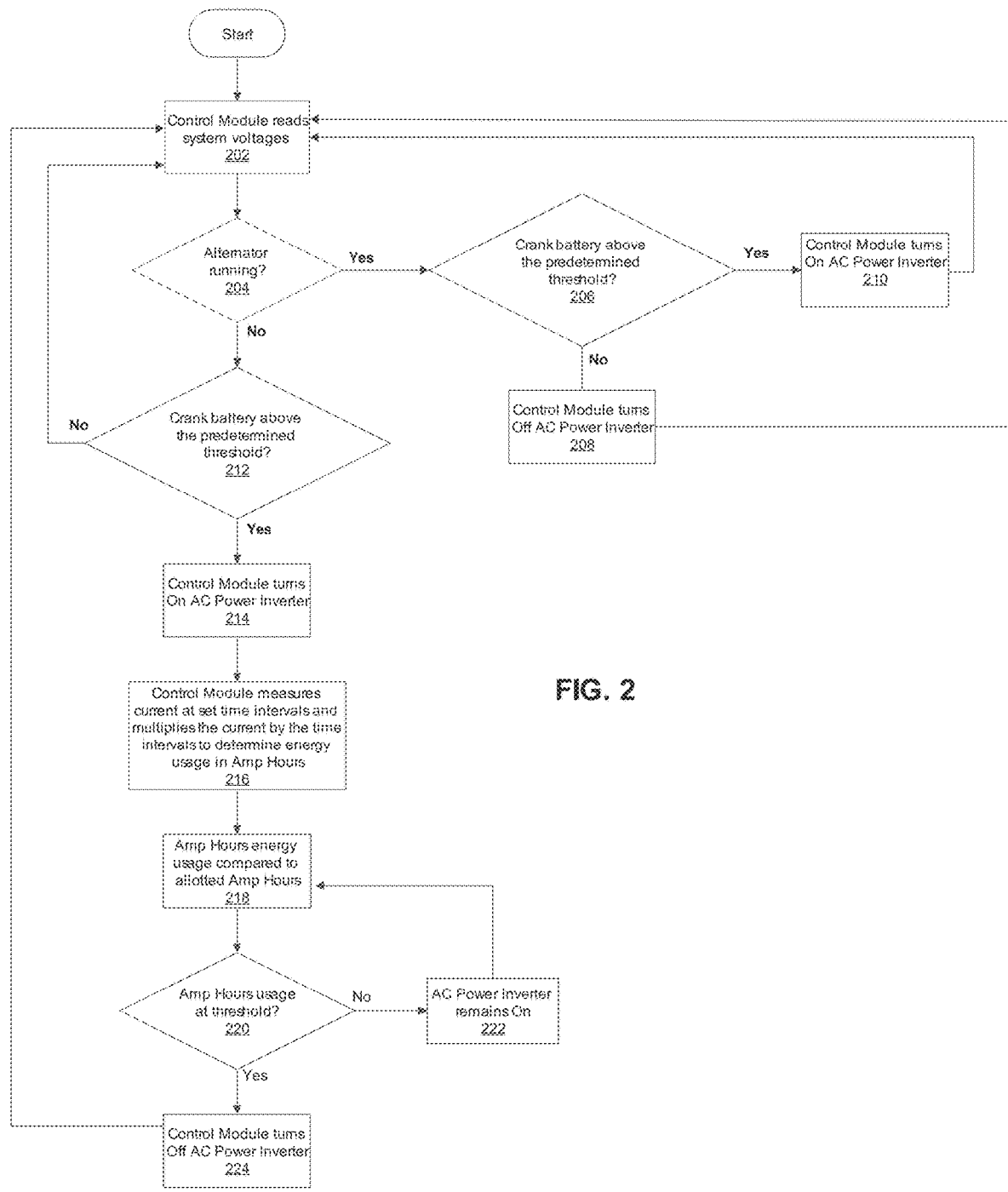
FIG. 2 is a flow chart indicating the steps of a system for controlling the inverter in one embodiment.

After the alternator 108 has been running for a minimum amount of time, the control module 102 resets the amount of available energy for the AC power inverter 114 to use. Once the alternator 108 is turned Off, the control module 102 calculates and monitors the energy that the AC power inverter 114 draws from the battery 104 and displays the used energy and/or the available energy on an LCD (or alternatively, through LEDs). Once the allowed energy is used, the control module 102 turns the AC power inverter 114 Off. The flowchart in FIG. 2 illustrates this process. For example, in step 202, the control module 102 reads the system voltages (i.e., battery voltage, shunt voltage, override switch) and in step 204 determines whether the alternator 108 is running (e.g., reading R-terminal, W-terminal, lamp voltage, or battery voltage). If the alternator 108 is running, then in step 206 the control module 102 determines whether the battery voltage is above a predetermined threshold (i.e., sufficient to start the vehicle). If there is sufficient voltage at the battery 104, then in step 210 a signal is sent from the control module 102 to activate (turn On) the AC power inverter 114 so that it is available for use. If the battery 104 did not have sufficient voltage, the AC power inverter 114 remains Off (or if previously On, the control module 102 sends a signal in 208 to turn it Off). Referring back to step 204, if the alternator 108 is not running, the voltage of the battery 104 is measured in step 212. If there is not sufficient voltage, the AC power inverter 114 remains off and the control module 102 continues to monitor the system. If the battery 104 does have sufficient voltage, then the control signal, in step 214, sends a signal to the AC power inverter 114 to turn it On. With the AC power inverter 114 On, the control module 102 then calculates how long the AC power inverter 114 can remain on without depleting the battery 104. For example, in step 216, the control module 102 measures current (e.g., by using the shunt voltage) at set time intervals, then multiplies the current by the time to determine energy usage in Amp Hours. Once the usage is determined, that value is compared against the allotted amount (e.g., total usable amp hours) in step 218. Step 220 then asks if the Amp Hour usage has reached the threshold (i.e., the allotted amount). If not, then in step 224, the inverter remains On. The process then continues to run, returning to step 218 to monitor Amp Hour usage. Once the Amp Hours used reaches the allotted amount, the control module 102 sends a signal to turn Off the AC power inverter 114 in step 224. The system then continues to be monitored in step 202, awaiting a change of circumstances (e.g., vehicle is started and alternator 108 is now running, etc.).

Figure 3:
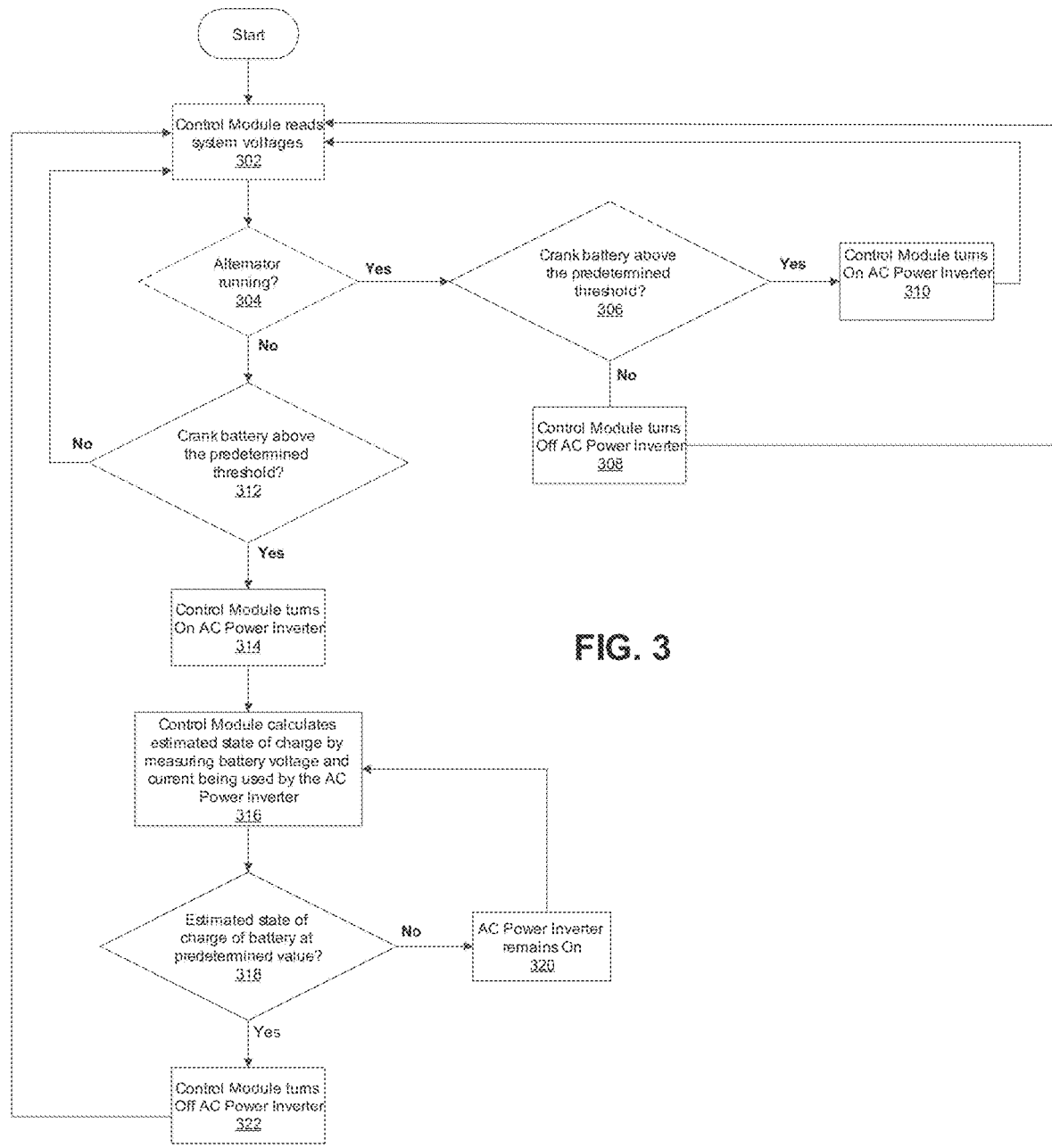
FIG. 3 is a flow chart indicating the steps of a system for controlling the inverter in one embodiment.

The control module 102 also estimates the state of charge of the battery 104 based on the voltage of the battery 104 and the current being drawn from the battery 104 by the AC power inverter 114. If the estimated state of charge drops below a predetermined value, then the control module 102 will turn Off the AC power inverter 114. Referring to FIG. 3, the flow is the same as FIG. 2 until step 316. In reaching step 316, the control module 102 has already determined that the alternator 108 is not running, but that the battery 104 has sufficient charge to run the AC power inverter. In step 316, the control module 102 then calculates the estimated state of charge by measuring battery voltage and current being used by the AC power inverter. In step 318, if the estimated state of charge remains above the threshold, the AC power inverter 114 remains On in step 320. The process then returns to step 316, where the control module 102 continues to monitor battery voltage. Once the battery 104 drops to the predetermined value, a signal is then sent, in step 322, to turn Off the AC power inverter. The process then returns to step 302 to monitor the system for changes (e.g., if the alternator 108 begins to run). Therefore, as FIGS. 2 and 3 illustrate, the AC power inverter 114 will be turned Off by the control module 102 if the predetermined allotted amount of energy is used by the AC power inverter 114 or if the estimated charge of the battery 104 drops below a predetermined value.

Heavy-duty trucks in the U.S. typically have between two and eight, group thirty-one, 12-volt batteries. Each battery has a capacity of about 100 amp-hours (Ah), which equates to a total energy of about 1200 watt-hours (Wh). As an example, on a truck that has four, group thirty-one batteries, the total capacity of the batteries would be about 400 Ah. To guarantee that sufficient energy remains in the batteries to be able to crank and start the engine, and to not cycle the batteries too deeply, it would be acceptable to allow the AC power inverter 114 to use up to about 200 Ah. To accomplish this, the control module 102 measures the current on measured time intervals and multiplies each current reading by the time interval. The control module 102 then sums up the product of the currents and the time intervals. For example, if the control module 102 takes current readings every 0.5 seconds (1/7200 hour) for 30 minutes (3600 readings), and if each of those current readings is 50 amps, then the total number of Ah used would be 50 amps multiplied by 1/7200 hours, multiplied by 3600 readings, which equals 25 Ah. At this rate, it would take four hours for the AC power inverter 114 to use the allotted 200 Ah, at which time the control module 102 would turn the AC power inverter 114 Off.

Therefore, in one embodiment, a system 100 for controlling an AC power inverter comprises a charging power source (e.g., vehicle alternator 108), a battery 104 (e.g., vehicle crank battery or an auxiliary battery), a DC to AC power inverter 114, a shunt 106 or current-measuring device (which may either be internal to, or external to, the AC power inverter 114), electrical connections (i.e., cables and connections between the charging power source, battery, AC power inverter, and shunt), and a control module 102 wherein the control module 102 is capable of measuring shunt voltage, battery voltage, elapsed time, and is capable of turning the AC power inverter 114 On and Off based upon certain criteria (i.e., control logic). The system 100 is therefore able to calculate the energy used, estimate the dynamic state of charge, turn the AC power inverter 114 Off when the energy used reaches a predetermined allotment, and also turn the AC power inverter 114 Off when the state of charge reaches a predetermined set-point.

Figure 4:
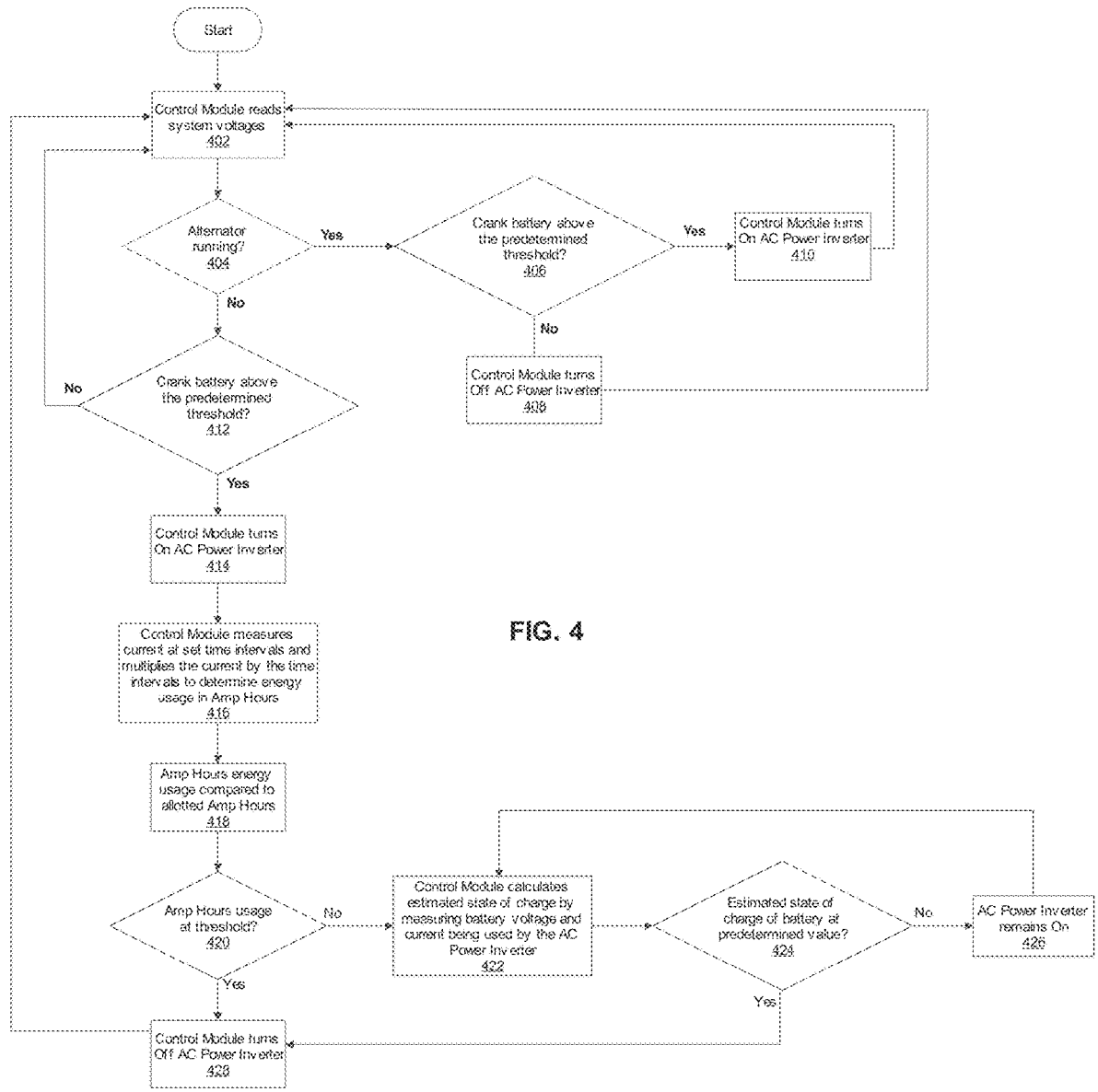
FIG. 4 is a flow chart indicating the steps of a system for controlling the inverter in one embodiment.

Referring to FIG. 4, a system in one embodiment is illustrated wherein the control module 102 monitors both Amp Hour usage and the estimated charge of the battery 104. For example, looking at step 420, if the Amp Hour usage has not yet reached the threshold, the system then verifies, in steps 422 and 424, that the estimated state of charge of the battery 104 has not dropped to a predetermined level. As such, if the Amp Hour usage is met, the control module 102 turns the AC power inverter 114 in step 428 off. Alternatively, if the Amp Hour usage has not been met (steps 420 to 422), but the estimated state of charge has dropped to a predetermined value (step 424), the control module 102 likewise turns the AC power inverter 114 Off in step 428.

Referring back to FIG. 1, in one embodiment, the system 100 above may further comprise a display 116 (which may be located on the control module 102) for indicating the energy used or the available energy remaining for use. It may also monitor and display the energy based upon the status of the alternator 108 (such as by monitoring the R-terminal, W-terminal, or lamp signal, as described above).

Referring to the control module 102 in FIG. 1, it may comprise a microcontroller 112, a voltage regulator 118, a program port 120, and a communication (com) port 122. The control module 102 receives signals from the shunt 106, the battery 104, the R-terminal (or equivalent) of the alternator 108, and the override On/Off switch 110. The control module 102 may also comprise a real-time clock (RTC) 124. The microcontroller 112, using programmed logic, displays to a user (via an LCD or LEDs at 116), the current energy status. Once the energy used reaches the predetermined allotment, the microcontroller 112 sends a signal to turn Off the inverter. Likewise, should the state of charge reach the predetermined set-point, the microcontroller 112 will send a signal to the inverter 114 to turn it Off. If the alternator 108 is running, the microcontroller 112 may send a signal to the inverter 114 to turn it back On if predetermined criteria are met (e.g., the energy state of the crank battery 104 is above a minimum threshold, etc.).

It will therefore be appreciated that the foregoing invention disclosure solves many problems found in the industry. In particular, the above-described invention allows a vehicle operator to use a plethora of AC-powered devices (e.g., televisions, microwaves, computers, etc.) in a vehicle (e.g., commercial truck) without worrying about draining the batteries to a point where the vehicle cannot start. The system and components described above monitor power usage and consumption, and can dynamically adjust the length of time that an AC power inverter may be used, which is an improvement over the prior art—especially for use with items such as microwaves, hair blow dryers, etc.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

What is claimed is:

1. A system configured on a vehicle for controlling the On/Off status of an AC power inverter, the system having a control module, wherein the control module comprises:
   a microcontroller and an override switch, the microcontroller configured to continuously read the voltages of:
      a. a vehicle battery,
      b. a shunt,
      c. an alternator, and
      d. the override switch;
   the microcontroller reading the current being drawn by the inverter at set time intervals by reading the voltage of the shunt and calculating energy usage in amp-hours by multiplying the measured current by time;
   wherein the microcontroller compares the calculated energy usage against a threshold of usable amp-hours and sends a signal to the AC power inverter to turn it Off in response to determining that:
      a. the estimated charge of the vehicle battery is below a predetermined value; or
      b. the energy used has met the threshold of usable amp hours;
   and, upon determining that the alternator is running and that the energy state of the vehicle battery is above a minimum threshold, the microcontroller is configured to send a signal to the AC power inverter to turn the AC power inverter On.

2. The control module of the system of claim 1, wherein the microcontroller, upon determining that an alternator is Off, is configured to calculate and monitor the energy that the AC power inverter draws from the vehicle battery and is configured to display the used energy or the available energy on a display to a user.

3. The control module of the system of claim 1, further comprising a voltage regulator, a program port, and communication port.

4. A system configured on a vehicle for controlling the On/Off status of an AC power inverter, the system comprising:
   a charging power source;
   a vehicle battery
   an AC power inverter;
   a shunt; and
   a control module;
   wherein the control module reads the current being drawn by the inverter at set time intervals by reading the voltage of the shunt and calculates energy usage in amp-hours by multiplying the measured current by time, the control module comparing the calculated energy usage against a threshold of usable amp-hours and sending a signal to the AC power inverter to selectively turn On or Off the AC power inverter in response to determining that
      a. the estimated charge of the vehicle battery is below a predetermined value; or
      b. the energy used has met the threshold of usable amp hours.

5. The system of claim 4, wherein the control module is configured to read the voltage of the vehicle battery and current being drawn by the AC power inverter to estimate the state of charge of the vehicle battery.

6. The system of claim 4, further comprising a display indicating to a user the energy used or the available energy.

7. A system configured on a vehicle for controlling the On/Off status of an AC power inverter, the system comprising:
   a control module comprising a microcontroller, a voltage regulator, a program port, and a communication port, and an override On/Off switch; wherein the control module is configured to receive signals from a shunt, a vehicle battery, and an alternator;
   wherein the microcontroller calculates energy usage in amp-hours by multiplying measured current at the shunt by time and displays to a user the current energy status of the battery, compares the calculated energy usage against a threshold of usable amp-hours and, upon determining that:
      a. the energy used has reached a predetermined allotment, or
      b. the state of charge has reached a predetermined set-point the microcontroller sends a signal to turn Off the AC power inverter; and upon determining that the alternator is running and that the energy state of the vehicle battery is above a minimum threshold, the microcontroller is configured to send a signal to the AC power inverter to turn the AC power inverter On.

* * * * *